Feb. 4, 1969  K. THORNTON  3,425,620

ROTARY PISTON ENGINE GEARING

Filed March 10, 1967  Sheet 1 of 2

Inventor
KENNETH THORNTON
By
Cushman, Darby & Cushman
Attorneys

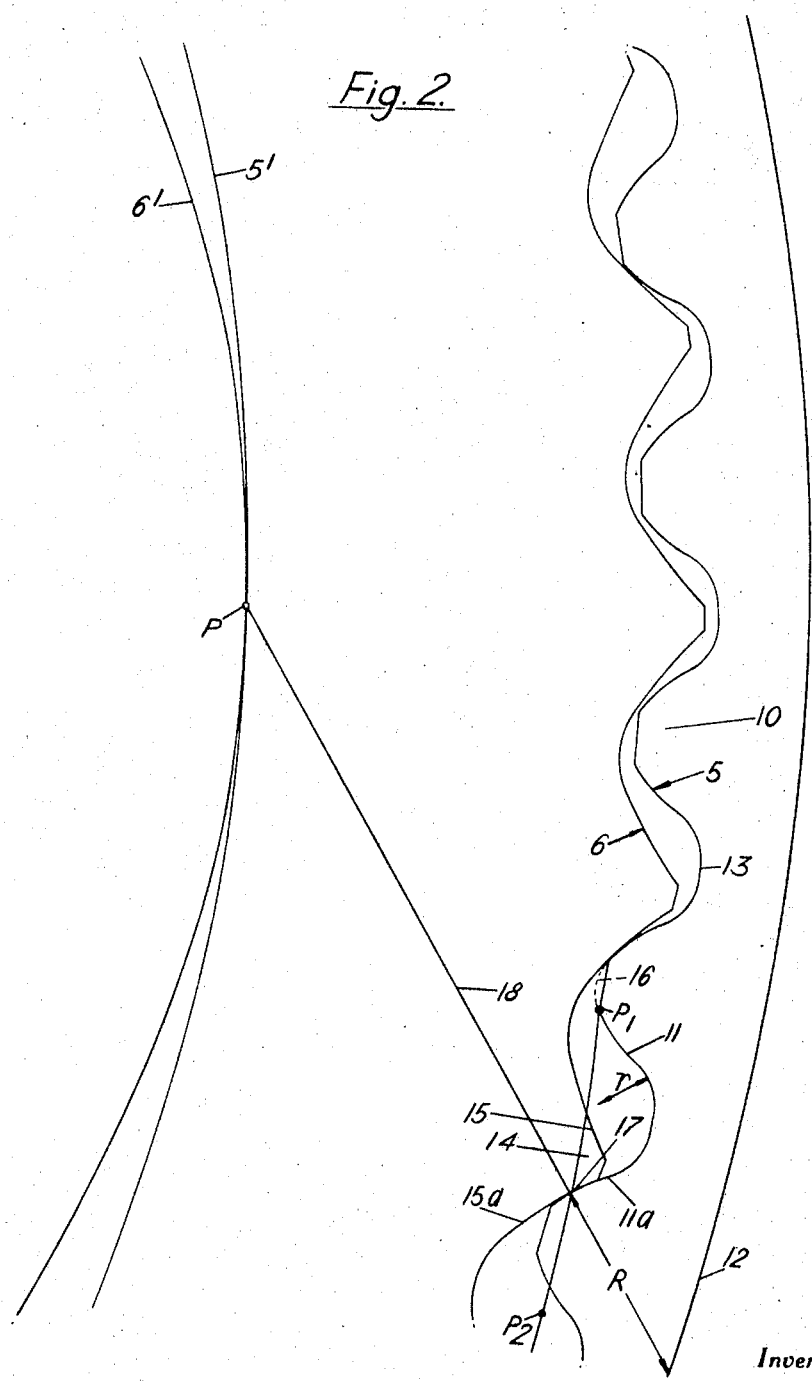

United States Patent Office

3,425,620
Patented Feb. 4, 1969

---

3,425,620
ROTARY PISTON ENGINE GEARING
Kenneth Thornton, Nantwich, England, assignor to Rolls-Royce Limited, Derby, England, a British company
Filed Mar. 10, 1967, Ser. No. 622,333
Claims priority, application Great Britain, Mar. 28, 1966, 13,664/66
U.S. Cl. 230—145     14 Claims
Int. Cl. F04c *17/02;* F16h *1/28;* F02b *53/00*

ABSTRACT OF THE DISCLOSURE

Gearing suitable for a rotary piston engine and comprising an externally toothed gear meshing with and mounted within an internally toothed gear, the diameters of the addendum and dedendum circles of each gear being substantially greater than the pitch circle diameter thereof; the working profiles of the teeth of one of the gears being in the form of circular arcs and the working profiles of the teeth of the other gear being conjugate thereto. The gears are adapted for relative eccentric rotation.

---

Figure 1:
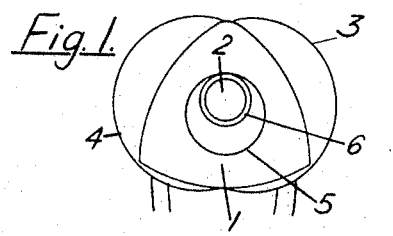

This invention concerns improvements relating to gearing.

Although the invention is not so restricted, it will be more particularly described with reference to its use in a rotary piston engine.

In such an engine, a piston may rotate upon an eccentric journal fixed to a shaft, the shaft being rotatable relative to a housing within which the piston is mounted, there being provided an internally toothed gear which is secured co-axially to the piston and which meshes with an externally toothed gear which is secured to the housing and which is co-axial with the shaft.

The eccentricity of the axis of the piston with respect to the axis of the shaft is determined by the sizes of the piston and housing, and the required velocity ratio between the externally and internally toothed gears is dictated by the shapes of the piston and of the housing. The said eccentricity and the said ratio will in turn determine the pitch circle diameters of the internally and externally toothed gears. Thus once the sizes and shapes of the piston and housing have been decided upon, this will determine the said pitch circle diameters. The pitch circle diameters are defined as the diameters of a pair of cylinders in rolling contact whose axes are coincident with the axes of the gears and the ratio of whose diameters is equal to the velocity ratio.

Accordingly, if the externally and internally toothed gears have conventional involute teeth, i.e. which lie on or near the pitch circles, the diameter of the said shaft will have to be such as to accommodate the roots of the teeth of the externally toothed gear, and this will in some cases mean that the diameter of the shaft is small and therefore that the shaft does not have adequate strength and bearing area. This disadvantage is particularly present when the rotary piston engine is a compression ignition engine, and/or when several pistons are arranged co-axially in line to form a multicylinder engine.

While it is conventional that the teeth of meshing gears lie on or near the pitch circle, there is no theoretical necessity that they should do so, and the diameters of a pair of internally meshing gears can be increased to values substantially exceeding the respective pitch circle diameters. However, if the diameters of involute teeth gears are increased relative to their pitch circle diameter, the length of the path of contact becomes shorter. In a rotary piston engine, the increase in diameter of the gears necessary to accommodate a shaft of adequate diameter results in a path of contact so short that continuous transmission of torque is not obtained if involute teeth are used.

According therefore to one aspect of the present invention, there is provided gearing comprising an externally toothed gear meshing with and mounted within an internally toothed gear, the diameters of the addendum and dedendum circles of each gear being substantially greater than the pitch circle diameter thereof, the working profiles of the teeth of one of the gears being in the form of circular arcs and the working profiles of the teeth of the other gear being conjugate thereto, the teeth of each gear being such that there is continuous transmission of torque from one gear to the other, and vice-versa.

Therefore, a shaft fitted to the externally toothed gear may have a diameter which is substantially greater than would be possible if the teeth were of conventional involute form.

The said one gear is preferably the internally toothed gear.

The circular arcs which form the working profiles of a tooth of the said one gear may be respectively centered upon respective spaced apart points lying on a common circle which is concentric with the pitch circle of the said gear. Thus, the depth of the teeth may be further reduced, allowing the shaft diameter to be further increased.

According, moreover, to another aspect of the present invention, there is provided an internally toothed gear adapted for use in the said gearing, the diameters of the addendum and dedendum circles of the gear being substantially greater than the pitch circle diameter thereof, the working profiles of the gear teeth of the gear being in the form of circular arcs or in a form conjugate thereto, and the said gear teeth being shaped to permit the said continuous transmission of torque.

According, moreover, to yet a further aspect of the present invention, there is provided an externally toothed gear adapted for use in the said gearing, the diameter of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

The teeth of the internally toothed gear may have fillets in the form of circular arcs.

The gears may be adapted for relative eccentric rotation.

In another aspect, the invention provides a rotary piston engine comprising a housing, a piston mounted therein, a shaft mounted within and rotatable relative to the housing, an eccentric journal fixed to the shaft and upon which the piston is rotatably mounted, an internally toothed gear secured to and concentric with the piston, an externally toothed gear secured to the housing coaxially with the shaft, and meshing with the internally toothed gear, the diameters of the addendum and dedendum circles of each gear being substantially greater than the pitch circle diameter thereof, the working profiles of the teeth of one of the gears being in the form of circular arcs and the working profiles of the teeth of the other gear being conjugate thereto, the teeth of each gear being such that there is continuous transmission of torque from the one gear to the other and vice-versa.

The invention further provides a rotary piston adapted for use in the rotary piston engine as set forth above, comprising means defining an eccentric bore in the piston, an internally toothed gear concentric with the piston and secured thereto, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

The invention also provides a rotary piston engine housing for use in the rotary piston engine as set forth above, comprising shaft mounting means to mount a shaft for rotation, an externally toothed gear secured to the housing coaxially with said shaft mounting means, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

Figure 3:
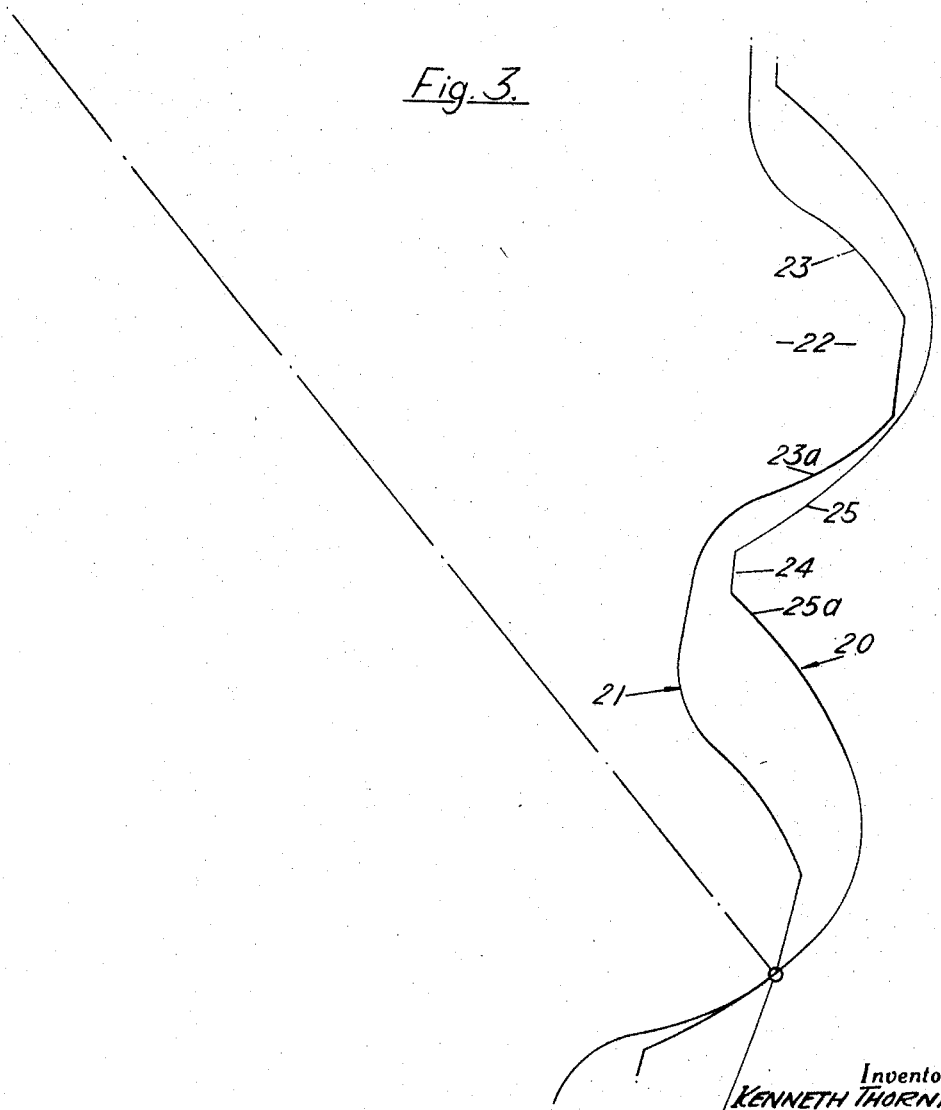

The invention is illustrated, merely by way of example, in the accompanying drawings, in which:

FIGURE 1 is a broken-away diagrammatic sectional view of a rotary piston engine provided with gearing in accordance with the present invention and FIGURES 2 and 3 are broken-away diagrammatic views of alternative forms of such gearing, the gearing comprising an internally toothed gear and an externally toothed gear.

In FIGURE 1 there is shown a rotary piston engine comprising a substantially triangular piston 1 which is rotatable upon an eccentric journal (not shown) fixed to a shaft 2. The shaft 2 is rotatable relative to a housing 3 having a cavity 4 which is shaped as a two-lobed epitrochoid, the piston 1 being mounted within the cavity 4.

An internally toothed gear 5 is secured coaxially to the piston 1, while an externally toothed gear 6 is secured to the housing 3 and is coaxial with the shaft 2. The externally toothed gear 6 is mounted within and is in constant mesh with the internally toothed gear 5. As will thus be appreciated, relative eccentric rotation occurs in operation between the gears 5, 6.

The substantially triangular shape of the piston 1 and the two-lobed epitrochoidal shape of the cavity 4, necessitate the gears 5, 6 having a ratio of 3:2. Thus the gear 5 may have sixty teeth and the gear 6 forty teeth.

The internally toothed gear 5 has teeth 10 whose working profiles 11, 11a are in the form of convex circular arcs of radius R, the centres of the said arcs lying on a common circle 12. It can be seen from FIGURE 1 that the circular arcs forming a particular tooth are respectively centered on respective spaced apart points. The internally toothed gear 5 also has fillets 13 having portions in the form of circular arcs of radius r, the centres of these arcs lying on a common circle (not shown).

The externally toothed gear 6 has teeth 14 whose working profiles 15, 15a are respectively conjugate to the working profiles 11, 11a of the internally toothed gear 5. The form of the teeth 14 of the gear 6 is in fact conjugate to the form of the teeth 10 of the gear 5 when the latter has been provided with a radiused tip 16 which generates the root clearances and the fillets of the teeth 14 of the gear 6.

The teeth of the gears 5, 6 are shaped to ensure that there is continuous transmission of uniform torque from one gear to the other. This is achieved by ensuring that each tooth 10 of the internally toothed gear 5 contacts the mating tooth 14 of the externally toothed gear 6 at a point 17 such that the normal 18 to the two contacting faces at the point 17 passes through the pitch point P at which the pitch circles 5', 6' of the gears 5, 6 intersect. All points of contact which meet this requirement lie on the line shown between the points $P_1$ and $P_2$.

If the gears are imagined to be rotating clockwise, each tooth profile 11a of the internally toothed gear 5 first contacts a tooth profile 15a of the externally toothed gear 6 when the tip of the respective tooth profile 11 is at the point $P_1$ and the contact ceases when the tip of the respective tooth profile 15a is at the point $P_2$. Before this latter position has been reached, however, the next tooth 10 of the gear 5 is in contact with the externally toothed gear 6. Thus the action is continuous.

The position of the point $P_2$ is determined by the shapes of the crests of the teeth of the gear 6, while the position of the point $P_1$ is determined by the desired maximum pressure angle which in the example illustrated is about 40°.

As will be appreciated, relative sliding, in addition to rolling, will occur between the working profiles of the gears 5, 6. It will also be appreciated that the roots and tips of the teeth of the gears 5, 6 lie on circles ("dedendum" and "addendum" circles respectively) having diameters which are substantially greater than their respective pitch circle diameters. In the case shown in the drawings, the root diameter of the gear 6 has been increased by about 25% by comparison with the diameter which it would have if conventional involute teeth were used, and therefore the strength of the largest shaft 2 which can be passed through the gear 6 has been at least doubled.

FIGURE 3 illustrates a modification in which an internally toothed gear 20 and an externally toothed gear 21 are used instead of the gears 5, 6. The externally toothed gear 21 has teeth 22 whose working profiles 23, 23a are in the form of convex circular arcs, while the internally toothed gear 20 has teeth 24 whose working profiles 25, 25a are respectively conjugate to the working profiles 23, 23a of the externally toothed gear 21. The arcs 23, 23a are respectively centered on respective spaced apart points, similarly to the gear shown in FIGURE 1.

If desired, the teeth of the gears 5 or 21 could have their working profiles in the form of concave circular arcs, the teeth of the gears 6 or 20 having conjugate working profiles.

It is, however, preferred to employ the gears 5, 6 as shown and thus to have the working profiles of the teeth of the gear 5 in the form of convex, as opposed to concave, circular arcs, for the reason that this simplifies production and minimises sliding between the meshing teeth. Thus, in the case of the gears 20, 21, retrogressive contact between the teeth occurs along a line 26 (i.e. engagement commences at the tip of the driving gear instead of near its root) and this leads to a reduced contact ratio and increased sliding velocity by comparison with the case of the gears 5, 6.

I claim:

1. Gearing comprising an internally toothed gear, an externally toothed gear meshing with and mounted within the internally toothed gear, the diameters of the addendum and dedendum circles of each gear being substantially greater than the pitch circle diameter thereof, the working profiles of the teeth of one of the gears being in the form of circular arcs and the working profiles of the teeth of the other gear being conjugate thereto, the teeth of each gear being such that there is continuous transmission of torque from the one gear to the other, and vice versa.

2. Gearing as claimed in claim 1 in which the said one gear is the internally toothed gear.

3. An internally toothed gear adapted for use in the gearing claimed in claim 1, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

4. An externally toothed gear adapted for use in the gearing claimed in claim 1, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

5. Gearing as claimed in claim 1, in which the said arcs are convex circular arcs.

6. Gearing as claimed in claim 5 in which the teeth of the one gear have fillets in the form of circular arcs.

7. Gearing as claimed in claim 1, wherein the said gears are adapted for relative eccentric rotation.

8. Gearing as claimed in claim 1 wherein the circular arcs which form the working profile of a tooth of the said one gear are respectively centered upon respective spaced apart points lying on a common circle which is concentric with the pitch circle of the said one gear.

9. A rotary piston engine comprising a housing, a piston mounted therein, a shaft mounted within and rotatable relative to the housing, an eccentric journal fixed to the shaft and upon which the piston is rotatably mounted, an internally toothed gear secured to and concentric with the piston, an externally toothed gear secured to the housing coaxially with the shaft, and meshing with the internally toothed gear, the diameters of the addendum and dedendum circles of each gear being substantially greater than the pitch circle diameter thereof, the working profiles of the teeth of one of the gears being in the form of circular arcs and the working profiles of the teeth of the other gear being conjugate thereto, the teeth of each gear being such that there is continuous transmission of torque from the one gear to the other and vice versa.

10. A rotary piston adapted for use in the rotary piston engine of claim 9, comprising means defining an eccentric bore in the piston, an internally toothed gear concentric with the piston and secured thereto, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

11. A rotary piston engine housing for use in the rotary piston engine of claim 9, comprising shaft mounting means to mount a shaft for rotation, an externally toothed gear secured to the housing coaxially with said shaft mounting means, the diameters of the addendum and dedendum circles of the gear being substantially greater than the pitch circle diameter thereof, the working profiles of the gear teeth of the gear being in the form of circular arcs or in a form conjugate thereto, the said gear teeth being shaped to permit the said continuous transmission of torque.

12. A rotary piston engine as claimed in claim 9 in which the said arcs are convex circular arcs.

13. A rotary piston engine as claimed in claim 12 in which the teeth of the one gear have fillets in the form of circular arcs.

14. A rotary piston engine as claimed in claim 9 wherein the circular arcs which form the working profile of a tooth of the said one gear are respectively centered upon respective spaced apart points lying on a common circle which is concentric with the pitch circle of the said one gear.

References Cited

UNITED STATES PATENTS

| | | | |
|---|---|---|---|
| 3,297,240 | 1/1967 | Tatsutomi | 230—145 |
| 1,421,375 | 7/1922 | Baines | 74—804 |
| 3,037,400 | 6/1962 | Sundt | 74—804 |
| 3,216,405 | 11/1965 | Jungbluth. | |

FOREIGN PATENTS 534,761   1/1955   Belgium.

ARTHUR T. McKEON, *Primary Examiner.*

U.S. Cl. X.R.

74—804; 123—8